(12) United States Patent
Wu et al.

(10) Patent No.: US 9,329,437 B2
(45) Date of Patent: May 3, 2016

(54) COMPOSITION, ALIGNMENT LAYER AND METHOD FOR PREPARING SAME, LIQUID CRYSTAL ALIGNMENT UNIT AND LIQUID CRYSTAL DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Hongliang Yuan, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/526,744

(22) Filed: Oct. 29, 2014

(65) Prior Publication Data
US 2015/0355508 A1  Dec. 10, 2015

(30) Foreign Application Priority Data

Jun. 5, 2014  (CN) .......................... 2014 1 0246932

(51) Int. Cl.
*C09K 19/00*  (2006.01)
*C09K 19/20*  (2006.01)
(Continued)

(52) U.S. Cl.
CPC .......... *G02F 1/133711* (2013.01); *C09K 19/00* (2013.01); *C09K 19/2021* (2013.01);
(Continued)

(58) Field of Classification Search
CPC ............. C09K 19/025; C09K 19/2007; C09K 19/2021; C09K 19/2028; C09K 19/2042; C09K 19/3809; C09K 19/54; C09K 19/586; C09K 2019/0448; C09K 2019/2035; C09K 2019/323; G02F 1/133753; G02F 1/133711; G02F 2001/133757; G02F 2001/133715
See application file for complete search history.

(56) References Cited

U.S. PATENT DOCUMENTS 5,332,520 A * 7/1994 Bach .................. C09K 19/3857
                                                    252/299.01
7,327,433 B2  2/2008 Miyachi et al.
(Continued)

FOREIGN PATENT DOCUMENTS

CN       1489706 A     4/2004
CN       1489708 A     4/2004
(Continued)

OTHER PUBLICATIONS

1st office action issued in Chinese application No. 201410246932.4 dated Nov. 11, 2015.

*Primary Examiner* — Shean C Wu
(74) *Attorney, Agent, or Firm* — Nath, Goldberg & Meyer; Joshua B. Goldberg; Tanya E. Harkins

(57) ABSTRACT

The invention belongs to the technical field of displaying, and provides a composition, an alignment layer and a method for preparing the same, a liquid crystal (LC) alignment unit and a liquid crystal display panel. The invention can solve the problems existing in the prior methods for achieving of multi-domain display of LC display devices, such as complex manufacturing processes, high cost, difficult to be manufactured. The composition (alignment layer) of the present invention allows adjusting the alignment of the molecules in the surface of the resultant coating layer of the composition, through adjusting the contents of the components in the composition, the polymerization temperature, and/or the thickness of the coating of the composition. The alignment layer, the LC alignment unit, and the LC display panel according to the invention can be prepared using a simple process and allow to achieve a multi-domain display at a lower cost.

18 Claims, 6 Drawing Sheets

(51) Int. Cl.
*C09K 19/54* (2006.01)
*G02F 1/1335* (2006.01)
*G02F 1/1337* (2006.01)
*C09K 19/58* (2006.01)
*C09K 19/04* (2006.01)
*C09K 19/32* (2006.01)

(52) U.S. Cl.
CPC ............... *C09K19/54* (2013.01); *C09K 19/586* (2013.01); *G02F 1/133514* (2013.01); *G02F 1/133753* (2013.01); *C09K 2019/0448* (2013.01); *C09K 2019/2035* (2013.01); *C09K 2019/2042* (2013.01); *C09K 2019/2078* (2013.01); *C09K 2019/323* (2013.01); *G02F 2001/133715* (2013.01); *G02F 2001/133757* (2013.01); *Y10T 428/1005* (2015.01)

(56) References Cited

U.S. PATENT DOCUMENTS

| | | | |
|---|---|---|---|
| 2004/0056991 A1* | 3/2004 | Kashima | G02B 5/3016 349/89 |
| 2004/0130670 A1* | 7/2004 | Kashima | G02B 1/10 349/122 |
| 2005/0249889 A1 | 11/2005 | Hammond-Smith et al. | |
| 2008/0281108 A1* | 11/2008 | Farrand | C07D 321/10 549/348 |
| 2010/0038587 A1* | 2/2010 | Nagayama | C09K 19/3003 252/299.01 |
| 2010/0149446 A1* | 6/2010 | Fujisawa | C09K 19/3852 349/38 |

FOREIGN PATENT DOCUMENTS

| | | |
|---|---|---|
| CN | 1776514 A | 5/2006 |
| CN | 101646695 A | 2/2010 |
| JP | 2003186054 A | 7/2003 |

* cited by examiner

COMPOSITION, ALIGNMENT LAYER AND METHOD FOR PREPARING SAME, LIQUID CRYSTAL ALIGNMENT UNIT AND LIQUID CRYSTAL DISPLAY PANEL

FIELD OF THE INVENTION

The present invention relates to the technical field of displaying and, in particular, to a composition, an alignment layer and a method for preparing the same, a liquid crystal (LC) alignment unit and a liquid crystal display panel.

BACKGROUND OF THE INVENTION

LC display devices have been increasingly used in recent daily lives, such as mobile phone display screens, notebook display screens, GPS display screens, LCD TV display screens and the like. Along with the development of sciences and techniques, conventional mono-domain LC display devices could not meet the increasing requirements of LC display devices any more, due to their drawbacks including low contrast ratio, asymmetric viewing angle, shift in color when viewing images from various angles, and the like. Recently, multi-domain display technique has been widely used in the display field, because it can improve the asymmetric viewing angle of LC display devices, increase the viewing angle, enhance the contrast ratio, improve the gray-scale reversal, effectively improve the color shift, and the like.

Many patent literatures have disclosed the studies conducted for the purpose to achieve the multi-domain display of LC display devices. For example, one way to achieve the multi-domain display includes dividing a pixel of a LC display device into four sub-pixels, and then rubbing respectively in the four sub-pixel regions to make LC molecules form different primary alignments, which will form a multi-domain state when a voltage is applied. Alternatively, the multi-domain display may be achieved by preparing several protrusions under the pixel electrode, and establishing an oblique electric field between the pixel electrode having a particular shape and the common electrode on the upper glass substrate to align LC molecules along the electric field direction to form a multi-domain state. Also, the multi-domain display may be achieved by configuring a multi-domain type pixel electrode. However, the manufacturing process of the multi-domain film LC display device is complicated and difficult, and the manufacturing cost is expensive.

The conventional method which achieves multi-domain display by forming different primary alignments of LC molecules in a pixel through a rubbing alignment technique involves complicated manufacturing process and relatively high cost, and it is not so easy to achieve the desired effect.

SUMMARY OF THE INVENTION

An object of the present invention is to provide a composition, an alignment layer formed from the composition and a method for preparing the alignment layer, a LC alignment unit and a LC display panel, so as to solve the problems existing in the prior methods for achieving of multi-domain display of LC display devices, such as complex manufacturing processes, high cost, difficult to be manufactured.

The object is achieved by a composition of the present invention comprising a chiral compound and a smectic LC polymerizable monomer.

Preferably, the smectic LC polymerizable monomer is 2-methylbutyl 4'-(4-(6-(acryloxy)hexyloxy)benzoyloxy)biphenyl-4-carboxylate.

Preferably, the chiral compound is a binaphthol-based chiral compound.

Preferably, the binaphthol-based chiral compound is 1,1'-(4'-(2-methylbutyl) biphenyl) binaphthol ester.

Preferably, the composition further comprises a photoinitiator. The smectic LC polymerizable monomer and the chiral compound in the composition respectively have a mass fraction of x, y; the photoinitiator in the composition has a mass fraction of 0.05x, wherein x and y satisfy the following formula:

$$1.05x + y = 1, \text{ wherein } y \text{ is between } 0.04 \text{ and } 0.15.$$

Typically, the photoinitiator is an ultraviolet (UV) photoinitiator. Preferably, the photoinitiator is benzil dimethyl ketal.

Another object of the present invention is to provide an alignment layer which is prepared by polymerizing the composition.

Yet another object of the present invention is to provide a method for preparing the alignment layer, comprising the following steps:

1) Mixing

In this step, the smectic LC polymerizable monomer, chiral compound, and photoinitiator are mixed together in a predetermined ratio to form a composition;

2) Coating

In this step, the composition is coated onto a substrate to form a coating film of the composition;

3) Polymerization Reaction

The coating film of the composition is irradiated with UV light at a predetermined temperature to initiate polymerization of the smectic LC polymerizable monomer therein to produce a smectic LC polymer.

Preferably, the predetermined ratio is such that the smectic LC polymerizable monomer and the chiral compound in the composition respectively have a mass fraction of x, y; the photoinitiator in the composition has a mass fraction of 0.05x, wherein x and y satisfy the following formula:

$$1.05x + y = 1, \text{ wherein } y \text{ is between } 0.04 \text{ and } 0.15.$$

Preferably, the predetermined temperature is a temperature within ±3° C. of the smectic-cholesteric phase transition temperature of the composition, or any temperature at which the composition is in cholesteric phase.

Still another object of the present invention is to provide a LC alignment unit comprising a first alignment layer, wherein the first alignment layer is the alignment layer as described above.

Preferably, the first alignment layer comprises a plurality of alignment regions, wherein the adjacent alignment regions differ in alignment direction.

Preferably, the first alignment layer includes alignment regions separated from each other. The LC alignment unit further comprises a second alignment layer, wherein the first alignment layer is provided on the second alignment layer, and the second alignment layer has an alignment direction different from that of the alignment regions of the first alignment layer.

Still another object of the present invention is to provide a LC display panel, comprising an array substrate, a color filter substrate and a LC layer disposed therebetween, wherein a LC alignment unit as described above is provided on the side of the array substrate and/or the color filter substrate in contact with the LC layer.

The composition of the present invention allows adjusting the alignment of the molecules in the surface of the resultant coating layer of the composition, i.e., the orientation of the molecules in the outmost surface of the coating (which is also referred to as the alignment direction of the layer), through adjusting the contents of the components in the composition, the polymerization temperature, and/or the thickness of the coating of the composition.

The alignment layer, the LC alignment unit, and the LC display panel according to the present invention can be prepared using a simple process and allow to achieve a multi-domain display at a lower cost.

DETAILED DESCRIPTION OF CERTAIN EMBODIMENTS

Figure 1:
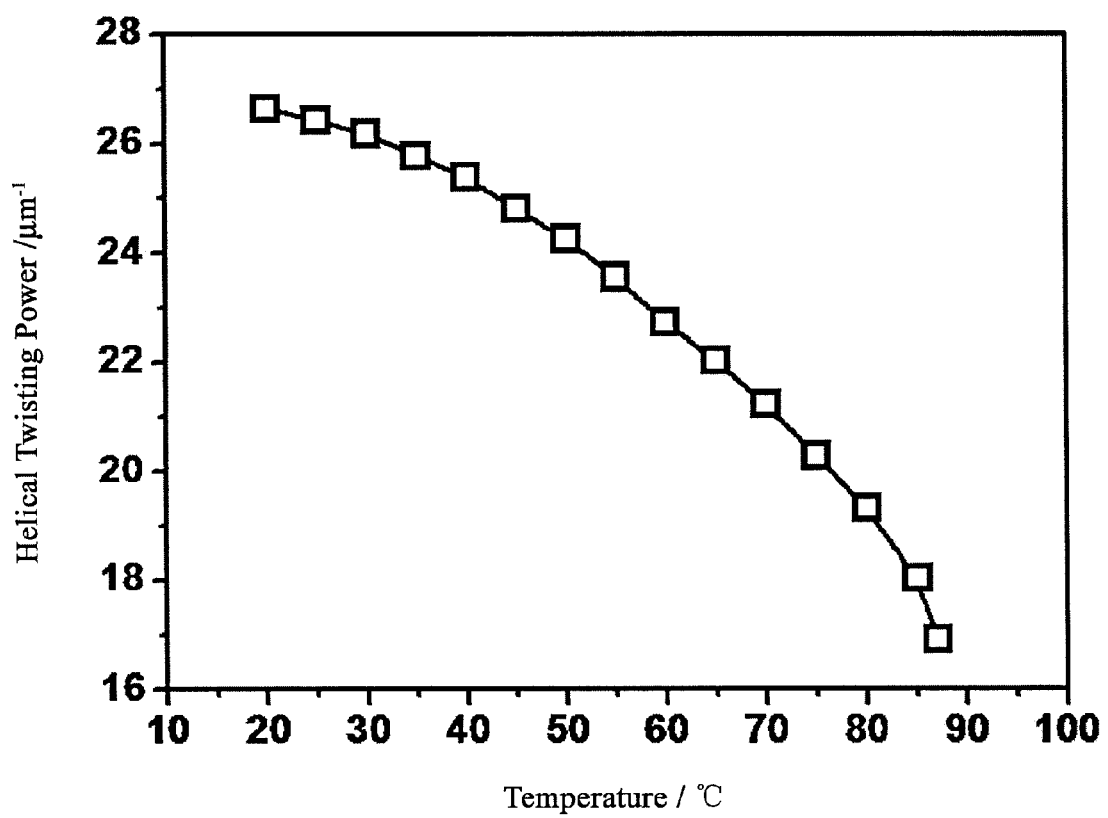
FIG. 1 is a graph showing the helical twisting power of a binaphthol-based chiral compound of the present invention depending on temperature.

Hereinafter, the present invention will further be described in detail with reference to the drawings and detailed embodiments, in order for one skilled in the art to better understand the technical solutions of the present invention.

Definitions

As used herein, the alignment direction of a first alignment layer (also referred to as "an alignment layer") refers to the alignment direction of the molecules in the surface of the alignment layer, which is indicated by an arrow in the said layer as shown in the drawings.

As used herein, the alignment direction of a second alignment layer (also referred to as "a conventional alignment layer") refers to the alignment direction of the molecules in the surface of a conventional alignment layer obtained by rubbing alignment, photo-alignment, or other techniques known in the art, which is indicated by an arrow in the said layer as shown in the drawings.

As used herein, the number of domains is defined as the number of alignment regions that directly contact with LC molecules in a LC layer and consist of adjacent alignment regions with different alignment directions.

As used herein, the term "smectic LC polymerizable monomer" refers to a liquid crystalline polymerizable monomer capable of exhibiting a smectic phase and a cholesteric phase in turn within a certain range of temperature.

Herein, the recitation of a numerical range by endpoints (for example, "in the range of a to b", "between a and b", and analogous expressions) include the endpoints, as well as all the numbers and subsets within that range, for example, "in a range of 0.04 to 0.15" or "between 0.04 and 0.15" includes 0.04, 0.05, 0.075, 0.10, 0.15, 0.04-0.075, etc.

One embodiment of the present invention provides a composition, comprising a chiral compound and a smectic LC polymerizable monomer.

The smectic LC polymerizable monomer may be commercially available or synthesized according to a process known in the art. Preferably, the smectic LC polymerizable monomer is 2-methylbutyl 4'-(4-(6-(acryloxy)hexyloxy)benzoyloxy) biphenyl-4-carboxylate.

The chiral compound may be commercially available or synthesized according to a process known in the art. Preferably, the chiral compound is a binaphthol-based chiral compound.

Preferably, the binaphthol-based chiral compound is 1,1'-(4'-(2-methylbutyl)biphenyl) binaphthol ester.

Preferably, the composition further comprises a photoinitiator. The smectic LC polymerizable monomer and the chiral compound in the composition respectively have a mass fraction of x, y; the photoinitiator in the composition has a mass fraction of 0.05x, wherein x and y satisfy the following formula:

$$1.05x + y = 1, \text{ wherein } y \text{ is between } 0.04 \text{ and } 0.15.$$

Typically, the photoinitiator is a UV photoinitiator. Preferably, the photoinitiator is benzil dimethyl ketal, which may be obtained from, for example, TCI Corporation, BASF Corporation (Germany), or Nanjing Wali Chemical Technology Co., LTD (China).

As shown in FIG. 1, the helical twisting power of the binaphthol-based chiral compound (for example, 1,1'-(4'-(2-methylbutyl)biphenyl) binaphthol ester) used in the present invention is relatively large and gradually decreases with the increase of temperature.

Helical twisting power (HTP) can be determined by the following equation:

HTP=$[P \cdot Xc]^{-1}$, wherein P is the pitch of a LC mixture comprising a chiral compound, and Xc is the mole concentration of the chiral compound. The pitch may be measured by Grandjean-Cano wedge technique, see I. I. Smalyukh and O. D. Lavrentovich, PHYSICAL REVIEW E 66, 051703 (2002), which is incorporated herein by reference. The pitch of the composition comprising the binaphthol-based chiral compound gradually increases with the increasing of temperature when the composition is in a cholesteric phase.

The smectic LC polymerizable monomer in the composition of the present invention has a property of undergoing a smectic-cholesteric phase transition with the increasing of temperature. The smectic-cholesteric phase transition temperature of the composition can be adjusted by adjusting the content of binaphthol-based chiral compound. As the content of binaphthol-based chiral compound in the composition increases, the smectic-cholesteric phase transition temperature gradually decreases; vice versa.

Figure 2:
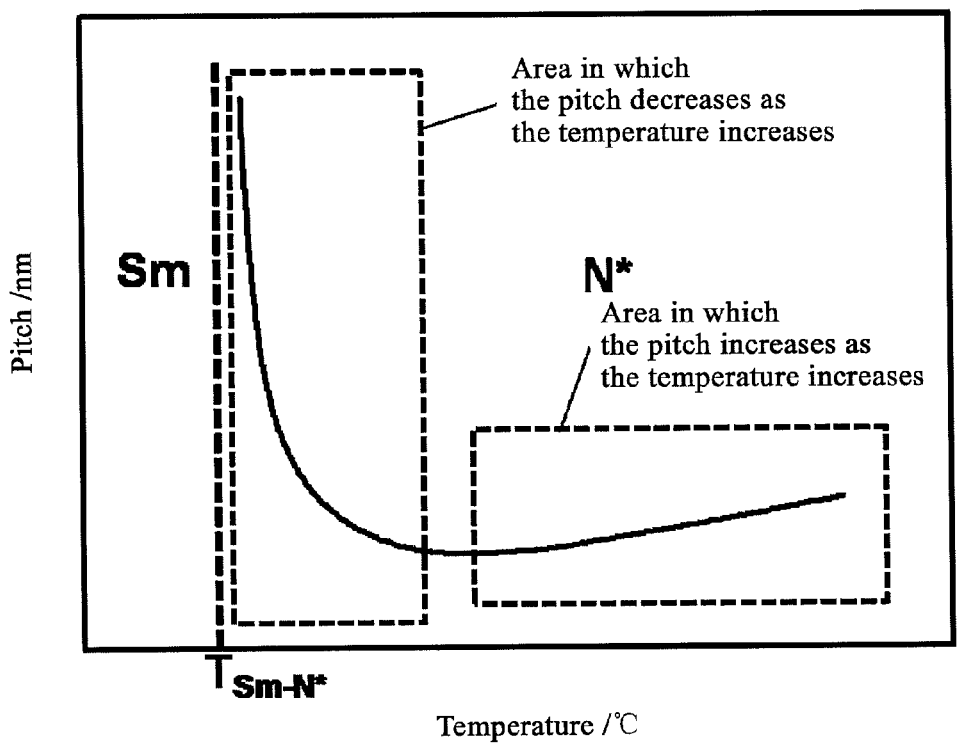
FIG. 2 is a graph showing the pitch of a composition of the present invention depending on temperature.

As shown in FIG. 2, when the temperature of the composition is increased to the vicinity of the smectic-cholesteric phase transition temperature ($T_{Sm-N}$*), a smectic-cholesteric phase transition starts to occur. When the temperature is continuously increased around $T_{Sm-N}$*, the pitch decreases gradually. The smectic-cholesteric phase transition progresses continuously as the temperature increases. When the temperature is continuously increased after the composition is completely in cholesteric phase, the pitch of the composition increases correspondingly as the temperature increases because the helical twisting power of the binaphthol-based chiral compound decreases with the increasing of the temperature. Therefore, when the composition is polymerized at different temperatures, LC polymers having various pitches can be obtained.

Figure 3:
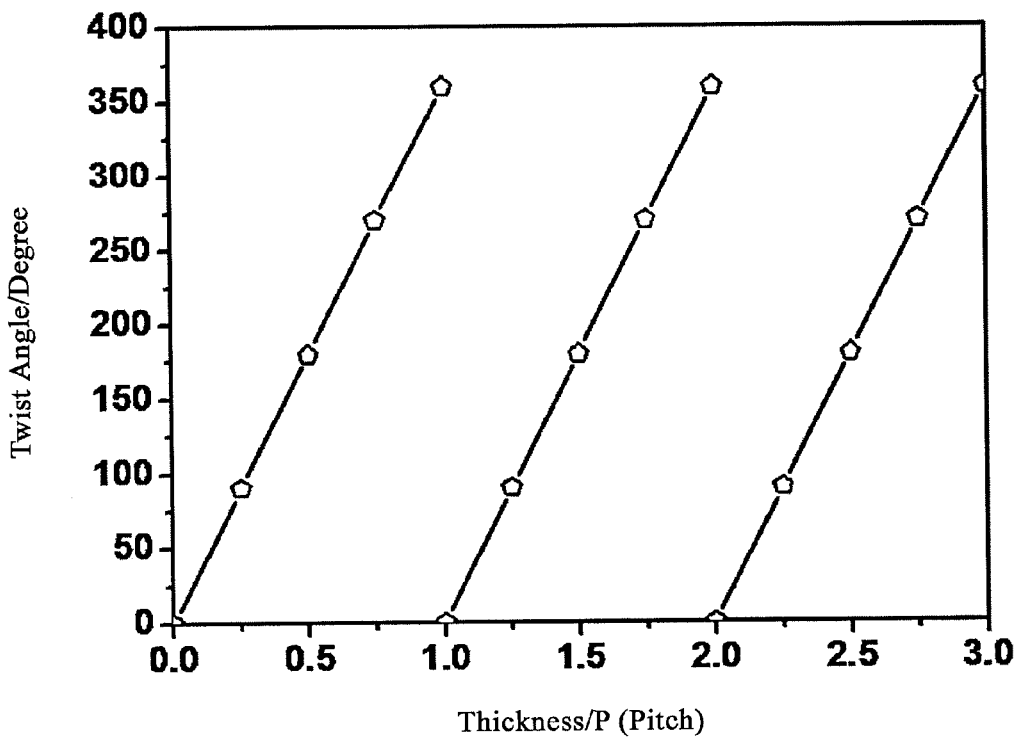
FIG. 3 is a graph showing the twist angle (i.e., alignment direction) of the molecules in the surface of the polymeric alignment layer prepared from a composition of the present invention, depending on the thickness of the alignment layer.

When the content of the binaphthol-based chiral compound in the composition and the polymerization temperature of the composition are kept constant, that is, when the pitch (P) is kept constant, the alignment direction of the alignment layer formed by polymerizing the composition may change depending on the thickness of the alignment layer. As shown in FIG. 3, the alignment direction of the alignment layer (i.e., the twist angle of the alignment direction of the molecules in the surface of the alignment layer) gradually rotates a certain degree as the thickness of the alignment layer (expressed by pitch) increases, and the twist angle cycles from 0 degree to 360 degree per increase of one pitch in thickness. The twist angle can be calculated according to the relation between the alignment layer thickness and the pitch, as will be described hereafter.

In summary, the alignment direction of the molecules in the surface of the alignment layer prepared from the composition of the invention (i.e., the alignment direction of the alignment layer) can be adjusted by modifying the component contents in the composition, the polymerization temperature, and the alignment layer thickness. When the alignment layer thickness and the polymerization temperature are kept constant, the smectic-cholesteric phase transition temperature of the composition gradually decreases as the content of the binaphthol-based chiral compound increases, and the pitch in the cholesteric phase state gradually decreases, such that the alignment direction of the molecules in the surface of the alignment layer (i.e., the alignment direction of the alignment layer) changes accordingly; vice versa.

When the content of the binaphthol-based chiral compound and the alignment layer thickness are kept constant, the pitch of the composition gradually decreases as the polymerization temperature increases in the vicinity of the smectic-cholesteric phase (Sm–N*) transition temperature, and the alignment direction changes accordingly. On the other hand, the pitch of the composition gradually increases as the polymerization temperature increases within a temperature range where the composition is completely in cholesteric phase (N* phase), and the alignment direction changes accordingly.

When the content of the binaphthol-based chiral compound in the composition and the polymerization temperature are kept constant, the alignment direction rotates a certain degree as the thickness of the alignment layer increases and cycles from 0 degree to 360 degree.

Another embodiment of the present invention provides an alignment layer which is prepared by polymerizing the composition of the invention.

Still another embodiment of the present invention provides a method for preparing the alignment layer as described above, comprising the following steps:

1) Mixing

In this step, the smectic LC polymerizable monomer, chiral compound, photoinitiator are mixed together in a predetermined ratio to form a composition;

2) Coating

In this step, the composition is coated onto a substrate to form a coating film of the composition;

3) Polymerization Reaction

The coating film of the composition is irradiated with UV light at a predetermined temperature to initiate polymerization of the smectic LC polymerizable monomer therein to produce a smectic LC polymer.

It should be noted that the polymerization reaction can be performed several times at different temperatures in different regions, and various photo masks may be used, such that alignment regions having different alignments are formed in the resultant coating layer of the composition.

For example, a photo mask having a predetermined shape may be provided on the coating film of the composition, such that a part of the coating film is shielded by the mask while the other is exposed outside. Then, the composition coating film is irradiated with UV light at a first temperature (i.e., the step of exposing), such that the smectic LC polymerizable monomer in the exposed part of the composition coating film undergoes a polymerization reaction to produce a smectic LC polymer having a first alignment direction. Thereafter, the photo mask is removed, and optionally, an additional and different photo mask is provided (or no photo mask is used any more), and then the composition coating film is irradiated with UV light at a second temperature different from the first temperature, such that the smectic LC polymerizable monomer in the part of the composition coating film that has been shielded previously and now is exposed (or a portion of that part, depending on whether the additional photo mask is used or not) undergoes a polymerization reaction to produce a smectic LC polymer having a second alignment direction, wherein the second alignment direction is different from the first alignment direction. Optionally, the above operations may be repeated several times. The alignment layer formed thereby is continuous and has a plurality of alignment regions, wherein the adjacent alignment regions are different in alignment direction.

Alternatively, after the smectic LC polymer having the first alignment direction is formed and the photo mask is removed, the smectic LC polymerizable monomer that is not exposed to UV light (i.e., not reacted) may be removed with solvents such as methylene chloride (i.e., the step of developing), thereby a discontinuous alignment layer is formed. The alignment layer thus formed is discontinuous and comprises alignment regions separated from each other, wherein the alignment directions of these alignment regions are the same.

The exposing step may also be performed twice or more, if necessary. Alternatively, several times of exposing operation may be performed in combination with developing operation, for example, exposing twice in combination with developing once. The alignment layer formed thereby is discontinuous (or may be continuous, if desired) and comprises alignment regions separated from each other, wherein the alignment directions of these alignment regions are different.

Preferably, the predetermined ratio is such that the smectic LC polymerizable monomer and the chiral compound in the composition respectively have a mass fraction of x, y; the photoinitiator in the composition has a mass fraction of 0.05x, wherein x and y satisfy the following formula:

$$1.05x+y=1, \text{ wherein } y \text{ is between 0.04 and 0.15.}$$

Preferably, the predetermined temperature is within ±3° C. of the smectic-cholesteric phase transition temperature of the composition, or any temperature at which the composition is in cholesteric phase.

Preferably, the coating film of the composition has a thickness in a range of from 100 to 2000 nm.

Another embodiment of the present invention provides a LC alignment unit, comprising a first alignment layer, wherein the first alignment layer is the alignment layer as described above.

Preferably, the first alignment layer comprises a plurality of alignment regions, wherein the adjacent alignment regions differ in alignment direction.

Preferably, the first alignment layer includes alignment regions separated from each other. The LC alignment unit further comprises a second alignment layer underneath the first alignment layer, wherein the alignment direction of the second alignment layer is different from that of the alignment regions of the first alignment layer.

Yet another embodiment of the present invention provides a LC display panel, comprising an array substrate, a color filter substrate and a LC layer disposed therebetween, wherein a LC alignment unit as described above is provided on the side of the array substrate and/or the color filter substrate in contact with the LC layer.

Hereinafter, the advantages and the embodiments of the present invention will be further described by examples. However, the specific materials and the amounts thereof, as well as other conditions and details mentioned in the examples should not be construed to unduly limit the scope of the present invention.

EXAMPLE 1

In this example, a composition, an alignment layer prepared from the composition, an alignment unit comprising the alignment layer and the preparing methods thereof are provided.

The composition of this example comprises 1,1'-(4'-(2-methylbutyl)biphenyl) binaphthol ester as a chiral compound, 2-methylbutyl 4'-(4-(6-(acryloxy)hexyloxy) benzoyloxy)biphenyl-4-carboxylate as a smectic LC polymerizable monomer, and benzil dimethyl ketal as a photoinitiator. The materials are commercially available or may be synthesized according to a process known in the art. For example, the chiral compound may be synthesized according to the process described in the literature: Guo, R. W.; Cao, H.; Liu, H. J.; Li, K. X.; Huang, W.; Xiao, J. M.; Yuan, X. T.; Yang, Z.; Yang, H. Liq. Cryst. 2009, 36, 939-946. The benzil dimethyl ketal is available from TCI Corporation.

The chiral compound is represented by the following formula:

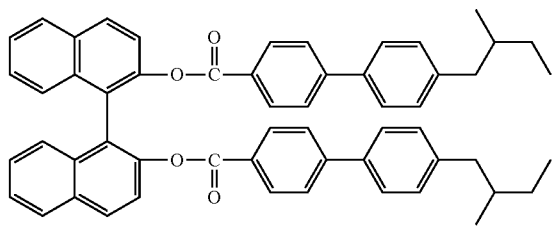 [SMILES: CCC(C)Cc1ccc(-c2ccc(C(=O)Oc3ccc4ccccc4c3-c3c(OC(=O)c4ccc(-c5ccc(CC(C)CC)cc5)cc4)ccc4ccccc34)cc2)cc1]

The smectic LC polymerizable monomer is represented by the following formula:

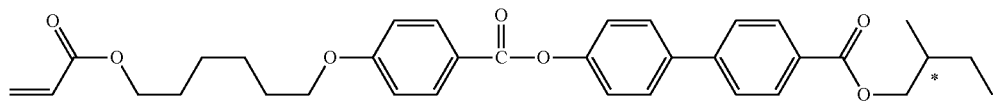

The photoinitiator is represented by the following formula:

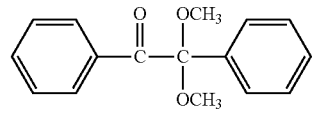

The chiral compound, the smectic LC polymerizable monomer and the photoinitiator in the composition have a mass fraction of 4.0%, 91.4%, and 4.6%, respectively.

The alignment layer and the alignment unit of this example are prepared by polymerizing the composition. The process comprises the following steps:

Preparation of a Conventional Alignment Layer

A conventional alignment layer was prepared on a glass substrate by a process known in the art, and then was imparted an alignment direction by rubbing.

Preparation of a Smectic LC Polymer Alignment Layer

1) Mixing

The smectic LC polymerizable monomer, the chiral compound, and the photoinitiator were mixed in the ratio as described above to form a composition. The composition thus formed has a Sm–N* phase transition temperature of 90° C., and has a pitch of 2000 nm at 89° C.

2) Coating

While shielded from light, the composition was uniformly coated onto the conventional alignment layer by a transfer coating process, thereby forming a coating film of the composition having a thickness of 250 nm.

3) Polymerization Reaction

The coating film of the composition was covered with a mask having a predetermined shape and was subjected to UV irradiation at 5 mw/cm$^2$ for 40 minutes (min) under a temperature of 89° C., such that the smectic LC polymerizable monomer in the exposed part of the film was polymerized to produce a smectic LC polymer.

The smectic LC polymerizable monomer that was not exposed to the UV irradiation (i.e., not reacted) was removed with methylene chloride, thereby a smectic LC polymer alignment layer was formed on the conventional alignment layer and the angle between the alignment directions thereof was 45°. It should be noted that the conventional alignment layer may be an alignment layer having an alignment direction imparted by rubbing, or may be an alignment layer prepared by other methods known in the art.

The alignment direction of the smectic LC polymer alignment layer is different from the alignment direction of the conventional alignment layer, which is desirable to achieve a multi-domain display.

It should be noted that the composition may also be coated directly onto a glass substrate and then polymerized to form a smectic LC polymer alignment layer.

EXAMPLE 2

In this example, a composition, an alignment layer prepared from the composition, an alignment unit comprising the alignment layer and the preparing methods thereof are provided.

The composition of this example comprises
1,1'-(4'-(2-methylbutyl)biphenyl)binaphthol ester represented by the following formula, as a chiral compound:

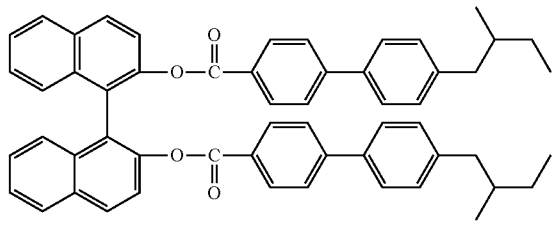

2-methylbutyl 4'-(4-(6-(acryloxy)hexyloxy)benzoyloxy) biphenyl-4-carboxylate represented by the following formula, as a smectic LC polymerizable monomer:

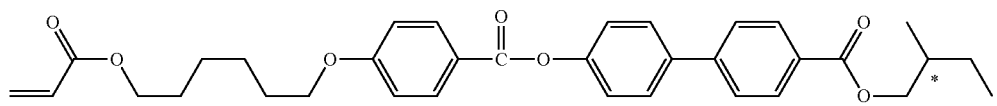 [SMILES: C=CC(=O)OCCCCCCOc1ccc(C(=O)Oc2ccc(-c3ccc(C(=O)OCC(C)CC)cc3)cc2)cc1]

and
benzil dimethyl ketal represented by the following formula, as a photoinitiator

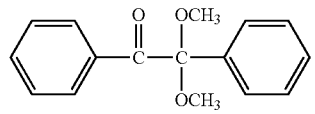

The chiral compound, the smectic LC polymerizable monomer and the photoinitiator in the composition have a mass fraction of 8.0%, 87.6%, and 4.4%, respectively.

The alignment layer and the alignment unit of this example are prepared by polymerizing the composition. The process comprises the following steps:

Preparation of a Conventional Alignment Layer

A conventional alignment layer was prepared on a glass substrate by a process known in the art, and then was imparted an alignment direction by rubbing.

Preparation of a Smectic LC Polymer Alignment Layer

1) Mixing

The smectic LC polymerizable monomer, the chiral compound, and the photoinitiator were mixed in the ratio as described above to form a composition. The composition thus formed has a Sm–N* phase transition temperature of 70° C., and has a pitch of 980 nm at 68° C.

2) Coating

While shielded from light, the composition was uniformly coated onto the conventional alignment layer by a transfer coating process, thereby forming a coating film of the composition having a thickness of 245 nm.

3) Polymerization Reaction

The coating film of the composition was covered with a mask having a predetermined shape and was subjected to UV irradiation at 5 mw/cm$^2$ for 40 min under a temperature of 68° C., such that the smectic LC polymerizable monomer in the exposed part of the film was polymerized to produce a smectic LC polymer.

The smectic LC polymerizable monomer that was not exposed to the UV irradiation (i.e., not reacted) was removed with methylene chloride, thereby a smectic LC polymer alignment layer was formed on the conventional alignment layer and the angle between the alignment directions thereof was 90°. It should be noted that the conventional alignment layer may be an alignment layer having an alignment direction imparted by rubbing, or may be an alignment layer prepared by other methods known in the art.

The alignment direction of the smectic LC polymer alignment layer is different from the alignment direction of the conventional alignment layer, which is desirable to achieve a multi-domain display.

It should be noted that the composition may also be coated directly onto a glass substrate and then polymerized to form a smectic LC polymer alignment layer.

EXAMPLE 3

In this example, a composition, an alignment layer prepared from the composition, an alignment unit comprising the alignment layer and the preparing methods thereof are provided.

The composition of this example comprises:
1,1'-(4'-(2-methylbutyl)biphenyl) binaphthol ester represented by the following formula, as a chiral compound:

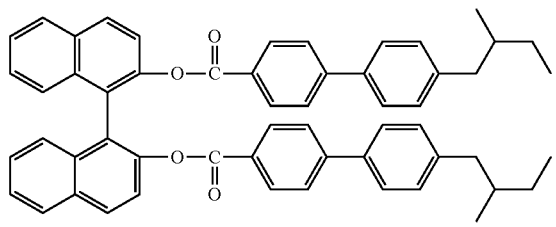 [SMILES: CCC(C)Cc1ccc(-c2ccc(C(=O)Oc3ccc4ccccc4c3-c3c(OC(=O)c4ccc(-c5ccc(CC(C)CC)cc5)cc4)ccc4ccccc34)cc2)cc1]

2-methylbutyl 4'-(4-(6-(acryloxy)hexyloxy)benzoyloxy) biphenyl-4-carboxylate represented by the following formula, as a smectic LC polymerizable monomer:

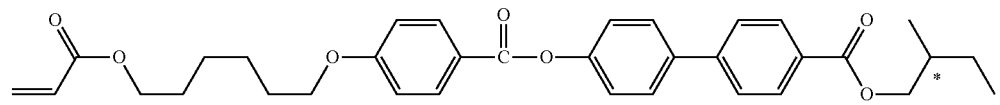 [SMILES: C=CC(=O)OCCCCCCOc1ccc(C(=O)Oc2ccc(-c3ccc(C(=O)OCC(C)CC)cc3)cc2)cc1]

and
benzil dimethyl ketal represented by the following formula, as a photoinitiator:

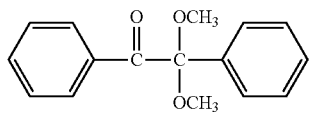

The chiral compound, the smectic LC polymerizable monomer and the photoinitiator in the composition have a mass fraction of 8.0%, 87.6%, and 4.4%, respectively.

The alignment layer and the alignment unit of this example are prepared by polymerizing the composition. The process comprises the following steps:

Preparation of a Conventional Alignment Layer

A conventional alignment layer was prepared on a glass substrate by a process known in the art, and then was imparted an alignment direction by rubbing.

Preparation of a Smectic LC Polymer Alignment Layer

1) Mixing

The smectic LC polymerizable monomer, the chiral compound, and the photoinitiator were mixed in the ratio as described above to form a composition. The composition thus formed has a Sm–N* phase transition temperature of 70° C., and has a pitch of 480 nm at 80° C.

2) Coating

While shielded from light, the composition was uniformly coated onto the conventional alignment layer by a transfer coating process, thereby forming a coating film of the composition having a thickness of 240 nm.

3) Polymerization Reaction

The coating film of the composition was covered with a mask having a predetermined shape and was subjected to UV irradiation at 5 mw/cm² for 40 min under a temperature of 80° C., such that the smectic LC polymerizable monomer in the exposed part of the film was polymerized to produce a smectic LC polymer.

The smectic LC polymerizable monomer that was not exposed to the UV irradiation (i.e., not reacted) was removed with methylene chloride, thereby a smectic LC polymer alignment layer was formed on the conventional alignment layer and the angle between the alignment directions thereof was 180°. It should be noted that the conventional alignment layer may be an alignment layer having an alignment direction imparted by rubbing, or may be an alignment layer prepared by other methods known in the art.

The alignment direction of the smectic LC polymer alignment layer is different from the alignment direction of the conventional alignment layer, which is desirable to achieve a multi-domain display.

It should be noted that the composition may also be coated directly onto a glass substrate and then polymerized to form a smectic LC polymer alignment layer.

EXAMPLE 4

In this example, a composition, an alignment layer prepared from the composition, an alignment unit comprising the alignment layer and the preparing methods thereof are provided.

The composition of this example comprises:

1,1'-(4'-(2-methylbutyl)biphenyl) binaphthol ester represented by the following formula, as a chiral compound:

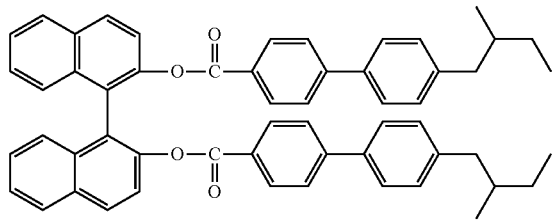 [SMILES: CCC(C)Cc1ccc(-c2ccc(C(=O)Oc3ccc4ccccc4c3-c3c(OC(=O)c4ccc(-c5ccc(CC(C)CC)cc5)cc4)ccc4ccccc34)cc2)cc1]

2-methylbutyl 4'-(4-(6-(acryloxy)hexyloxy)benzoyloxy)biphenyl-4-carboxylate represented by the following formula, as a smectic LC polymerizable monomer:

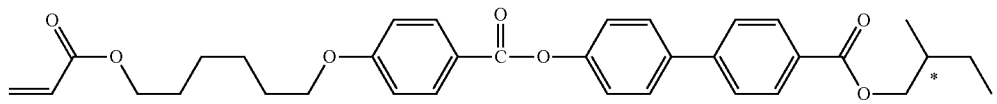 [SMILES: C=CC(=O)OCCCCCCOc1ccc(C(=O)Oc2ccc(-c3ccc(C(=O)OCC(C)CC)cc3)cc2)cc1]

and
benzil dimethyl ketal represented by the following formula, as a photoinitiator:

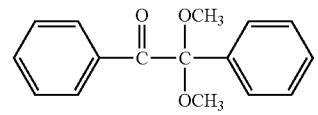 [SMILES: COC(OC)(C(=O)c1ccccc1)c1ccccc1]

The chiral compound, the smectic LC polymerizable monomer and the photoinitiator in the composition have a mass fraction of 15%, 80.95%, and 4.05%, respectively.

The alignment layer and the alignment unit of this example are prepared by polymerizing the composition. The process comprises the following steps:

Preparation of a Conventional Alignment Layer

A conventional alignment layer was prepared on a glass substrate by a process known in the art, and then was imparted an alignment direction by rubbing.

Preparation of a Smectic LC Polymer Alignment Layer

1) Mixing

The smectic LC polymerizable monomer, the chiral compound, and the photoinitiator were mixed in the ratio as described above to form a composition. The composition thus formed has a Sm–N* phase transition temperature of 42° C., and has a pitch of 360 nm at 48° C.

2) Coating

While shielded from light, the composition was uniformly coated onto the conventional alignment layer by a transfer coating process, thereby forming a coating film of the composition having a thickness of 270 nm.

3) Polymerization Reaction

The coating film of the composition was covered with a mask having a predetermined shape and was subjected to UV irradiation at 5 mw/cm² for 40 min under a temperature of 48°

C., such that the smectic LC polymerizable monomer in the exposed part of the film was polymerized to produce a smectic LC polymer.

The smectic LC polymerizable monomer that was not exposed to the UV irradiation (i.e., not reacted) was removed with methylene chloride, thereby a smectic LC polymer alignment layer was formed on the conventional alignment layer and the angle between the alignment directions thereof was 270°. It should be noted that the conventional alignment layer may be an alignment layer having an alignment direction imparted by rubbing, or may be an alignment layer prepared by other methods known in the art.

The alignment direction of the smectic LC polymer alignment layer is different from the alignment direction of the conventional alignment layer, which is desirable to achieve a multi-domain display.

It should be noted that the composition may also be coated directly onto a glass substrate and then polymerized to form a smectic LC polymer alignment layer.

EXAMPLE 5

Figure 4:
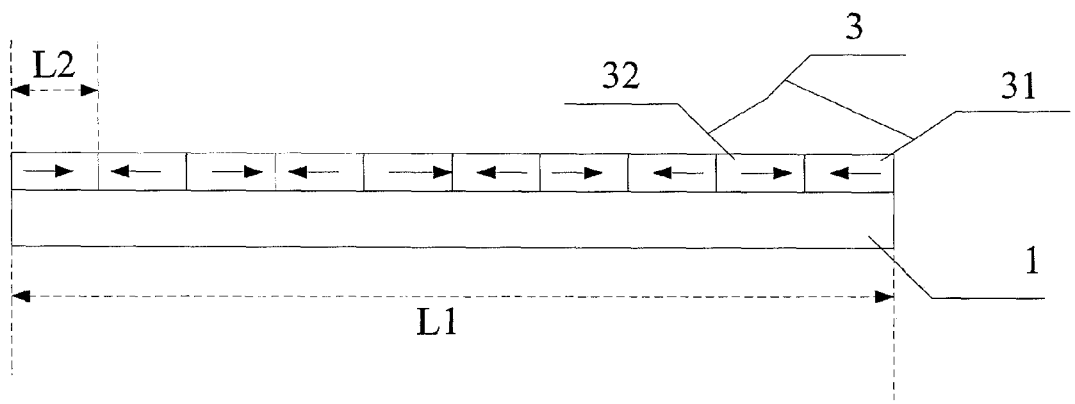
FIG. 4 is a schematic diagram showing the alignment unit according to Example 5 of the present invention, which includes a first alignment layer.

In this example, a LC alignment unit is provided, which comprises a glass substrate 1 and a first alignment layer 3 disposed thereon, as shown in FIG. 4. The first alignment layer 3 is the smectic LC polymer alignment layer prepared from any of the compositions in Examples 1-4 as described above.

Specifically, the first alignment layer 3 comprises a plurality of alignment regions 31, 32, wherein the adjacent alignment regions 31, 32 have different alignment directions. The first alignment regions 31 and the second alignment regions 32 are provided alternately within the length of a single pixel. The LC molecules directly contacting the first alignment layer 3 will be imparted the same alignment directions as those of the alignment regions 31, 32 of the alignment layer, such that various primary alignments of the LC molecules can be achieved within one pixel and a multi-domain display can be achieved accordingly. As shown in FIG. 4, the alignment region 31 of the first alignment layer 3 has a length of L2, and one single pixel has a length of L1. And 10-domain display is achieved within a single pixel length L1. It should be noted that different number of domains of display will be achieved according to the number of alignment regions 31, 32 provided within a single pixel length L1.

The alignment unit as shown in FIG. 4 is produced by subjecting the film of the composition coated on the glass substrate 1 to photo-polymerization twice at two different temperatures. For example, when the composition in Example 4 is used, the conditions of the two passes of exposure are as follows: in the first pass of exposure, the exposed part of the coating film of the composition is irradiated with a UV light having a light intensity of 5 mw/cm$^2$ at 48° C. for 40 min; in the second pass of exposure, another exposed part of the composition coating film is irradiated with a UV light having a light intensity of 5 mw/cm$^2$ at 60° C. for 40 min, after the mask being replaced. The shape of the mask for the first exposure and that for the second exposure may be determined according to the desired shape and configuration of the alignment regions, and there is no need to perform development with methylene chloride.

EXAMPLE 6

Figure 5:
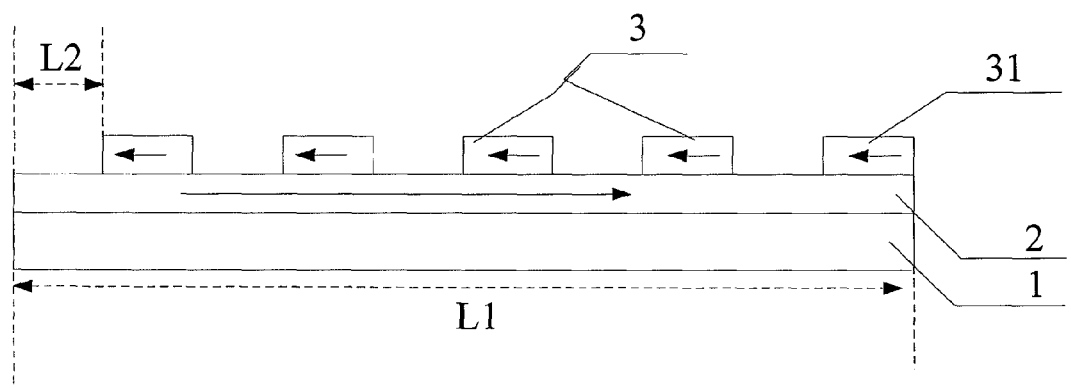
FIG. 5 is a schematic diagram showing the alignment unit according to Example 6 of the present invention, which includes a first alignment layer and a second alignment layer.

In this example, an alignment unit is provided, which comprises a first alignment layer 3 including alignment regions 31 separated from each other, as shown in FIG. 5. Unlike Example 5, the LC alignment unit of this example further comprises a second alignment layer 2, wherein the first alignment layer 3 is provided above the second alignment layer 2, and the second alignment layer 2 has an alignment direction different from that of the alignment regions 31 of the first alignment layer 3. All of the alignment regions 31 have the same alignment direction, as shown in FIG. 5. The alignment direction of the alignment regions 31 of the first alignment layer 3 is different from that of the second alignment layer 2, such that various primary alignments of the LC molecules can be achieved within one pixel and a multi-domain display can be achieved accordingly.

It should be noted that the alignment regions 31 may have different alignment directions. In this case, the alignment regions 31 may be formed by photo-exposure at different temperatures with different photo masks, followed by development with methylene dichloride to remove the smectic LC polymerizable monomer that is not exposed to UV light (i.e., not reacted). The alignment regions 31 thus formed have different alignment directions.

Figure 6:
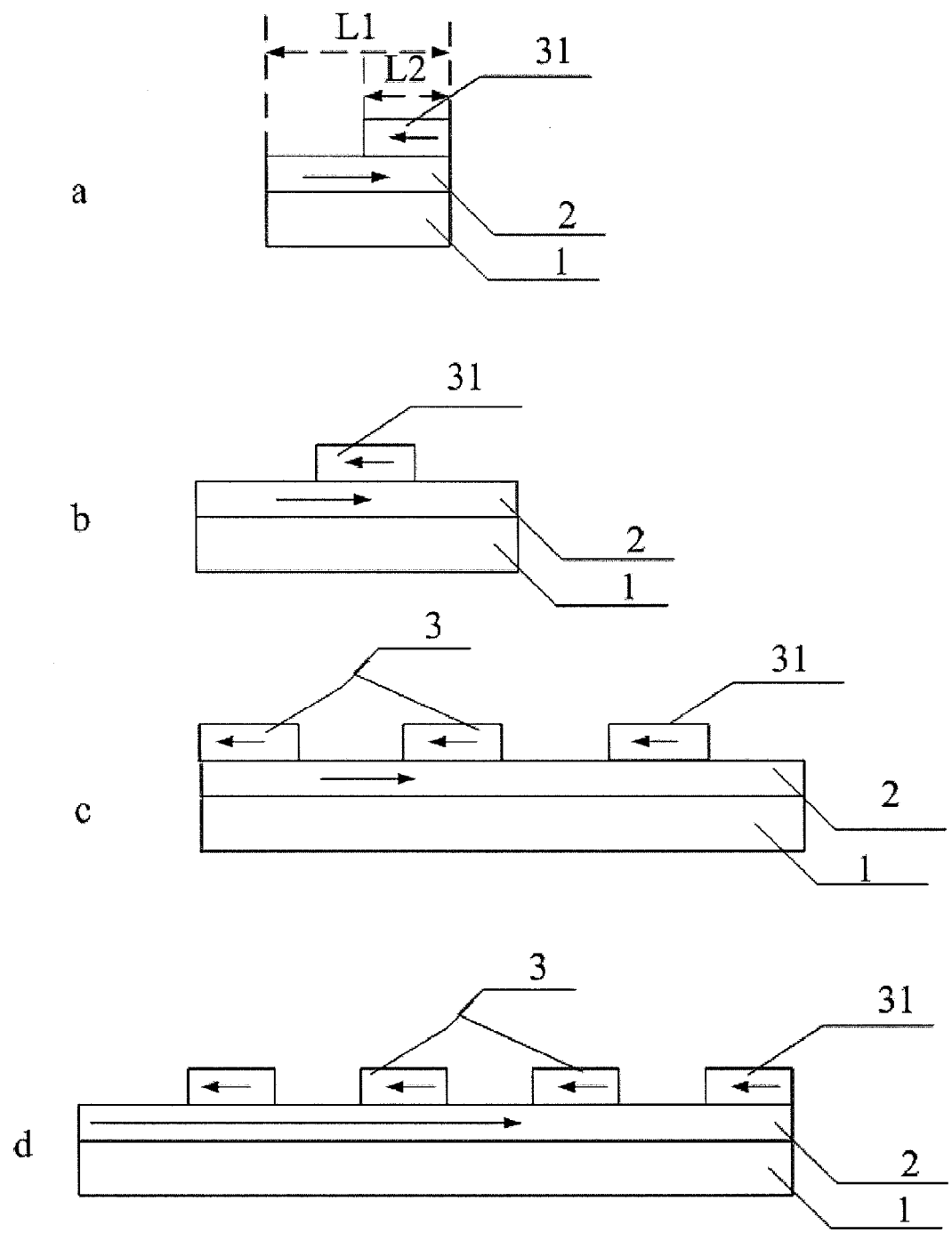
FIG. 6 is a schematic diagram showing achievement of a multi-domain display by adjusting the alignment region length of the first alignment layer within the length of a single pixel of the alignment unit, according to Example 6 of the present invention.

As shown in FIG. 6, a multi-domain display can be achieved by adjusting the relationship between the length L2 of an alignment region 31 of the first alignment layer 3 and the length L1 of one single pixel.

When L2=L1/2, a half of the LC molecules in a single pixel directly contact the second alignment layer 2, while the other half of the LC molecules directly contact the first alignment layer 3. Thus, two kinds of primary alignments of the LC molecules are formed in a single pixel, and a two-domain LC display is achieved accordingly, as shown in FIG. 6a.

When L2=L1/3, the LC molecules exhibit three kinds of primary alignments in a single pixel, and thus a three-domain LC display is achieved, as shown in FIG. 6b.

When L2=L1/6, the LC molecules exhibit six kinds of primary alignments in a single pixel, and thus a six-domain LC display is achieved, as shown in FIG. 6c.

When L2=L1/8, the LC molecules exhibit eight kinds of alignments in a single pixel, and thus an eight-domain LC display is achieved, as shown in FIG. 6d.

Therefore, when L2=L1/n (n is a positive integer), the LC molecules exhibit n kinds of primary alignments in a single pixel, and thus a multi-domain display is achieved. In addition, the size of each alignment region of the first alignment layer 3 may be adjusted by modifying the size of the mask used for forming the alignment region. The processes for preparation of the alignment units as shown in FIG. 5 and FIG. 6 just require one pass of photo-polymerization, respectively.

Figure 7:
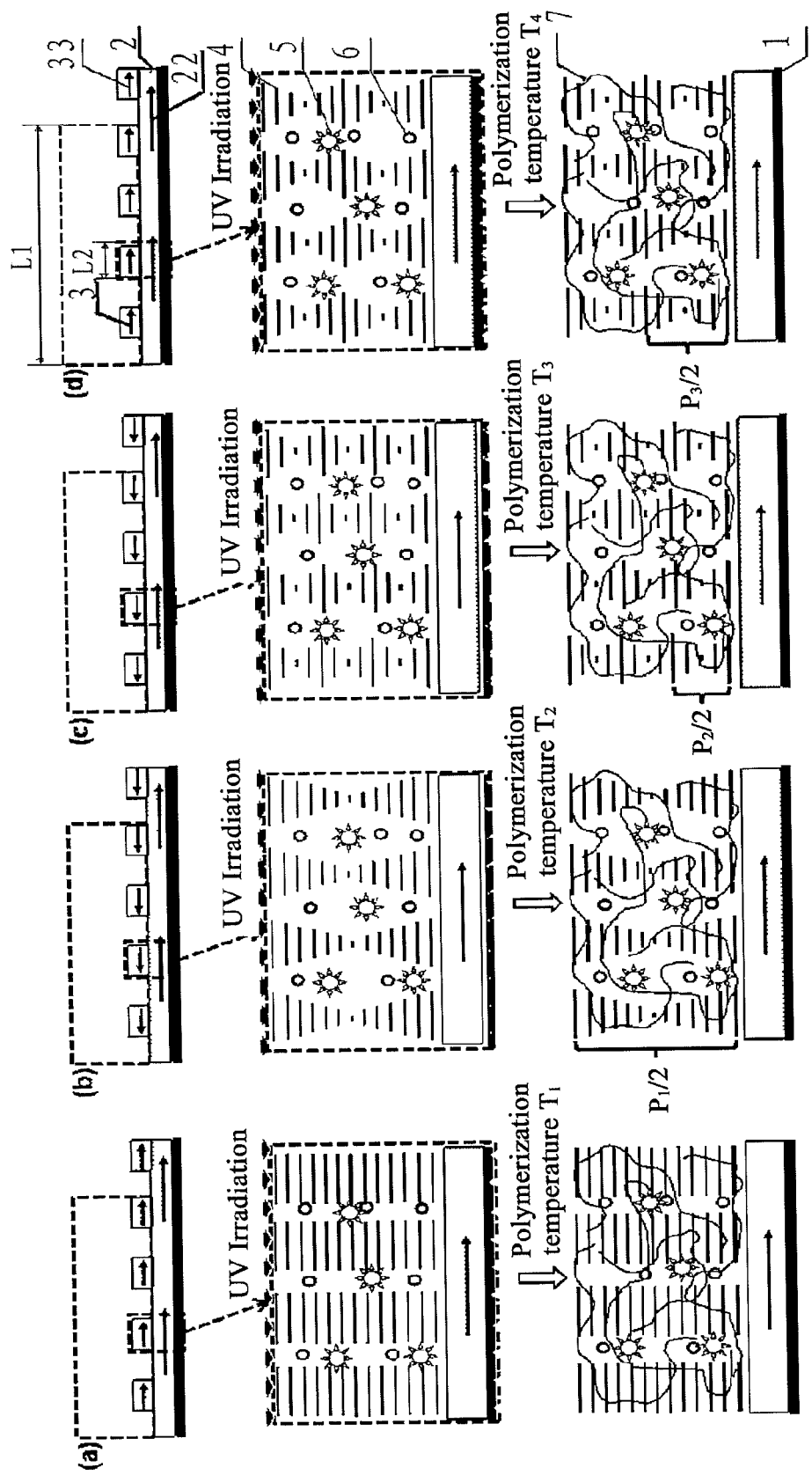
FIG. 7 is a schematic diagram showing the alignment direction of the first alignment layer in the alignment unit depending on the polymerization temperature T, according to Example 6 of the present invention.

The alignment unit as described above comprises a first alignment layer 3 and a second alignment layer 2, which can be prepared simply by forming the first alignment layer 3 on a conventional alignment layer (i.e., the second alignment layer 2). As shown in FIG. 7, the preparation process of such an alignment unit comprising two alignment layers will be described in detail with reference to the formation process of the smectic LC polymer alignment layer (i.e., the first alignment layer 3).

As shown in FIG. 7, a second alignment layer 2, with an alignment direction being horizontally to the right, is formed on a glass substrate 1 according to a known process. Then, a first alignment layer 3 is formed on the second alignment layer 2 through the same procedure as described in Examples 1-4 with respect to the smectic LC polymer alignment layer. Within the length L1 of a single pixel, four alignment regions of the first alignment layer 3 are provided separately, wherein the four alignment regions are prepared by polymerization once at one same polymerization temperature using one photo mask. In this way, the first alignment layer 3 and the second alignment layer 2 form an eight-domain display within a single pixel. It should be noted that the shorter the length of each alignment region 31, 32 is, the more the number of domains of display is achieved.

The first alignment layer 3 is obtained by polymerizing a composition of the present invention which comprises a smectic LC polymerizable monomer 4 (for example, 2-methylbutyl 4'-(4-(6-(acryloxy)hexyloxy)benzoyloxy)biphenyl-4-carboxylate), a binaphthol-based chiral compound 5 (for example, 1,1'-(4'-(2-methylbutyl)biphenyl) binaphthol ester), and a photoinitiator 6 (for example, benzil dimethyl ketal). The polymerized first alignment layer 3 comprises a smectic LC polymer 7 (for example, poly(2-methylbutyl 4'-(4-(6-(acryloxy)hexyloxy)benzoyloxy)biphenyl-4-carboxylate)) and the binaphthol-based chiral compound 5.

When the content of the binaphthol-based chiral compound 5 with respect to the first alignment layer 3, and the thickness of the first alignment layer 3 are kept constant, the alignment direction of the first alignment layer 3 will be influenced by the polymerization temperature T. As shown in FIG. 7, in the case where the composition used for forming the first alignment layer 3 is coated with the same thickness, the pitch of the composition will be different when the polymerization temperature T changes.

As shown in FIG. 7 (*a*), in the case where the polymerization temperature $T_1$ is lower than the smectic-cholesteric phase transition temperature $T_{Sm-N}*$ of the composition, the composition exhibits a smectic phase before polymerization, and the LC molecules do not have a twisted alignment. Thus, the alignment direction of the molecules in the surface of the first alignment layer 3 is the same as that of the second alignment layer 2, and the multi-domain display cannot be achieved.

As shown in FIG. 7 (*b*), in the case where the polymerization temperature $T_2$ is in the vicinity of the smectic-cholesteric phase transition temperature $T_{Sm-N}*$ of the composition ($T_2 = T_{Sm-N}* \pm 3°$ C.), the composition has a relatively large pitch $P_1$ (FIG. 7 (*b*) shows a length of $P_1/2$) due to the occurrence of smectic-cholesteric phase transition of the composition, and the LC molecules take on a twisted alignment. Thus, the alignment direction of the molecules in the surface of the first alignment layer 3 is different from that of the second alignment layer 2, and the multi-domain display can be achieved.

As shown in FIG. 7 (*c*), in the case where the polymerization temperature $T_3$ is slightly higher than the smectic-cholesteric phase transition temperature $T_{Sm-N}*$ of the composition, the LC molecules take on a twisted alignment and the pitch $P_2$ is relatively small (FIG. 7 (*c*) shows a length of $P_2/2$). Thus, the alignment direction of the molecules in the surface of the first alignment layer 3 is different from that of the second alignment layer 2, and the multi-domain display can be achieved.

As shown in FIG. 7 (*d*), in the case where the polymerization temperature $T_4$ is in the range of which the composition exhibits a cholesteric phase, the composition exhibits a cholesteric phase before polymerization, the LC molecules take on a twisted alignment and the pitch $P_3$ is relatively small (FIG. 7 (*d*) shows a length of $P_3/2$). Thus, the alignment direction of the molecules in the surface of the first alignment layer 3 is different from that of the second alignment layer 2, and the multi-domain display can be achieved.

Figure 8:
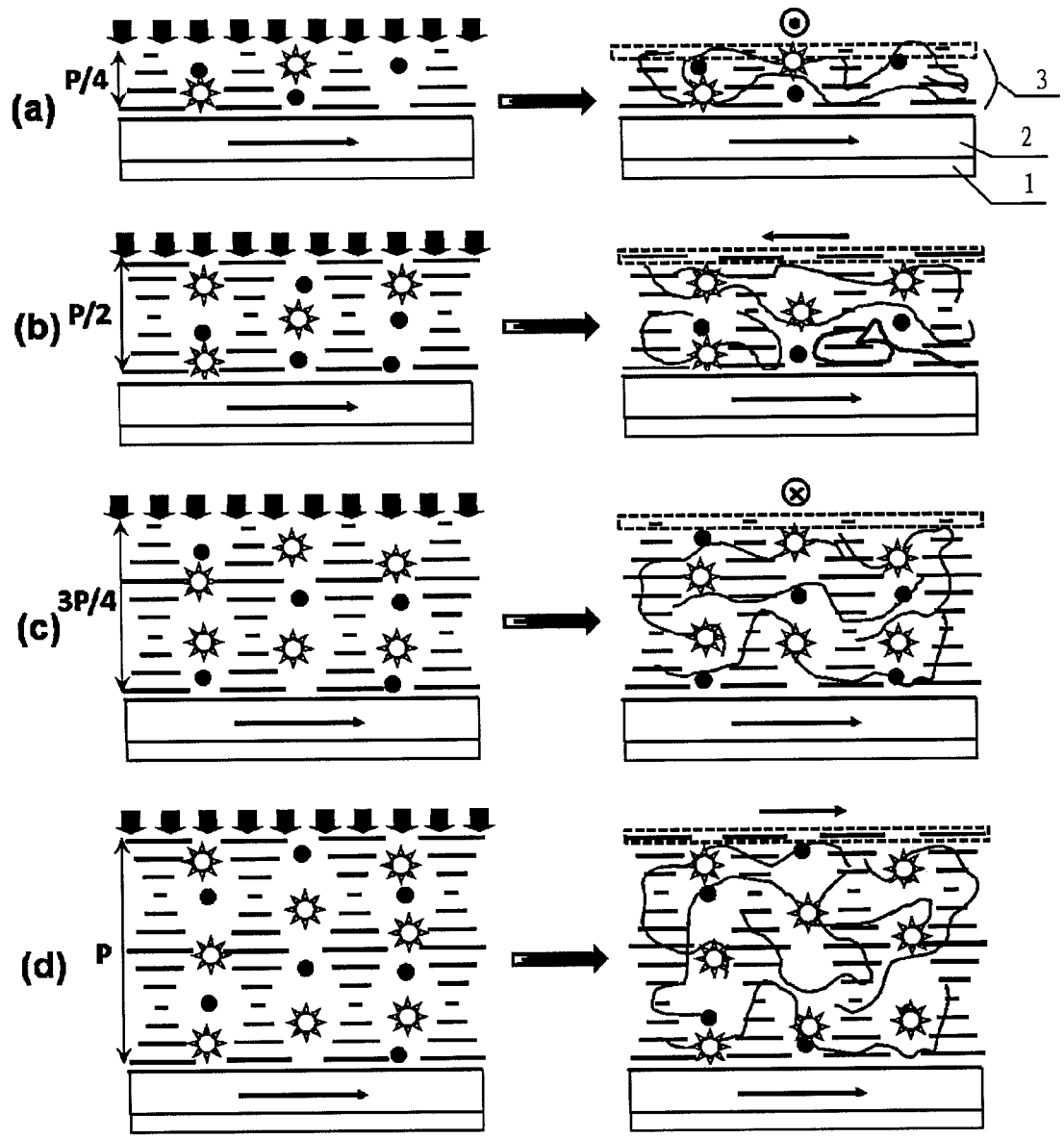
FIG. 8 is a schematic diagram showing the alignment direction of the first alignment layer in the alignment unit depending on the thickness of the alignment layer, according to Example 6 of the present invention.

It should be noted that the alignment direction of the first alignment layer 3 in the aforesaid alignment unit may also be adjusted by modifying the thickness of the first alignment layer 3. In particular, as shown in FIG. 8, when the content of the binaphthol-based chiral compound in the composition and the polymerization temperature are kept constant (i.e., the pitch (P) is kept constant), the alignment direction of the first alignment layer 3 varies depending upon the thickness of this layer. The angle between the alignment direction of the first alignment layer 3 and that of the second alignment layer will rotate a certain degree with the increase of the thickness of the first alignment layer 3, and cycle from 0 degree to 360 degree.

For example, when the thickness of the alignment layer $d=(n+0.25)$ P (n is an integer), the alignment direction of the smectic LC polymer alignment layer forms an angle of 90 degree relative to the alignment direction of the conventional alignment layer, as shown in FIG. 8 (*a*). When the thicknesses of the alignment layer $d=(n+0.5)$ P (n is an integer), the alignment direction of the smectic LC polymer alignment layer forms an angle of 180 degree relative to the alignment direction of the conventional alignment layer, as shown in FIG. 8 (*b*). When the thicknesses of the alignment layer $d=(n+0.75)$ P (n is an integer), the alignment direction of the smectic LC polymer alignment layer forms an angle of 270 degree relative to the alignment direction of the conventional alignment layer, as shown in FIG. 8 (*c*). When the thicknesses of the alignment layer $d=n$ P (n is an integer), the alignment direction of the smectic LC polymer alignment layer forms an angle of 360 degree relative to the alignment direction of the conventional alignment layer, that is, these two layers have the same alignment direction, as shown in FIG. 8 (*d*). Generally, the angle may be calculated according to the following equation:

$$\theta = (d/P - n) * 360$$

wherein, $\theta$ represents the angle between the alignment direction of the smectic LC polymer alignment layer and the alignment direction of the conventional alignment layer, which is also referred to as twist angle (unit: degree); d, P, and n have the same definition as above.

In other words, when the components of the composition, their contents and polymerization temperature are kept constant, alignment regions with various thicknesses may be formed. Thus, alignment regions having various alignment directions may be obtained, thereby a multi-domain display can be achieved.

EXAMPLE 7

In this example, a LC display panel is provided, which comprises an array substrate and a color filter substrate. As the array substrate glass, CORNING glass may be used. The color filter substrate is available from BOE Technology Group Co., Ltd, China. A LC alignment unit prepared in any of Examples 1-6 is provided on the side of the array substrate and/or the color filter substrate in contact with the LC layer. The LC alignment unit comprises a plurality of alignment regions within the length corresponding to one pixel, wherein the adjacent alignment regions differ in alignment direction. Therefore, a multi-domain LC display can be achieved.

It should be understood that the above embodiments of the invention have been disclosed only for illustrating the principle of the present invention, but they are not intended to limit the present invention. Obviously, the person skilled in the art can make various modifications and variations of the invention without departing from the spirit and scope of the invention, thus the modifications and variations of the invention are included within the scope of the present invention.

The invention claimed is:

1. A composition, characterized in that, the composition comprises a binaphthol-based chiral compound and a smectic liquid crystal polymerizable monomer.

2. The composition according to claim 1, characterized in that, said smectic liquid crystal polymerizable monomer is 2-methylbutyl 4'-(4-(6-(acryloxy)hexyloxy)benzoyloxy)biphenyl-4-carboxylate.

3. The composition according to claim 1, characterized in that, said binaphthol-based chiral compound is 1,1'-(4'-(2-methylbutyl) biphenyl) binaphthol ester.

4. The composition according to claim 1, characterized in that, said composition further comprises a photoinitiator; wherein said smectic liquid crystal polymerizable monomer and said binaphthol-based chiral compound in the composition respectively have a mass fraction of x, y; and said photoinitiator in the composition has a mass fraction of 0.05x; and wherein x and y satisfy the following formula:

$1.05x+y=1$, wherein $y$ is between 0.04 and 0.15.

5. The composition according to claim 4, characterized in that, said photoinitiator is benzil dimethyl ketal.

6. An alignment layer, characterized in that, said alignment layer is prepared by polymerizing a composition, wherein said composition comprises a binaphthol-based chiral compound and a smectic liquid crystal polymerizable monomer.

7. A method for preparing an alignment layer, characterized in that, said method comprises the following steps:
   1) mixing, in which a smectic liquid crystal polymerizable monomer, a binaphthol-based chiral compound, and a photoinitiator are mixed together in a predetermined ratio to form a composition;
   2) coating, in which said composition is coated onto a substrate to form a coating film of the composition; and
   3) polymerization reaction, in which said coating film of the composition is irradiated with UV light at a predetermined temperature to initiate polymerization of said smectic liquid crystal polymerizable monomer therein to produce a smectic liquid crystal polymer.

8. The method according to claim 7, characterized in that, said predetermined ratio is such that said smectic liquid crystal polymerizable monomer and said binaphthol-based chiral compound in the composition respectively have a mass fraction of x, y; and said photoinitiator in the composition has a mass fraction of 0.05x; wherein x and y satisfy the following formula:

$1.05x+y=1$, wherein $y$ is between 0.04 and 0.15.

9. The method according to claim 7, characterized in that, said predetermined temperature is a temperature within ±3° C. of the smectic-cholesteric phase transition temperature of said composition, or any temperature at which said composition is in a cholesteric phase.

10. A liquid crystal alignment unit, characterized in that, said liquid crystal alignment unit comprises a first alignment layer, said first alignment layer being prepared by polymerizing a composition comprising a binaphthol-based chiral compound and a smectic liquid crystal polymerizable monomer.

11. The liquid crystal alignment unit according to claim 10, characterized in that, said first alignment layer comprises a plurality of alignment regions, wherein adjacent alignment regions differ in alignment direction.

12. The liquid crystal alignment unit according to claim 10, characterized in that,
said first alignment layer includes alignment regions separated from each other;
said liquid crystal alignment unit further comprises a second alignment layer, wherein said first alignment layer is provided on said second alignment layer, and said second alignment layer has an alignment direction different from that of said alignment regions of the first alignment layer.

13. A liquid crystal display panel, characterized in that, the liquid crystal display panel comprises an array substrate, a color filter substrate and a liquid crystal layer disposed therebetween, wherein a liquid crystal alignment unit is provided on the side of the array substrate and/or the color filter substrate in contact with the liquid crystal layer, wherein said liquid crystal alignment unit comprises a first alignment layer, said first alignment layer being prepared by polymerizing a composition comprising a binaphthol-based chiral compound and a smectic liquid crystal polymerizable monomer.

14. The liquid crystal display panel according to claim 13, characterized in that, said first alignment layer comprises a plurality of alignment regions, wherein adjacent alignment regions differ in alignment direction.

15. The liquid crystal display panel according to claim 13, characterized in that,
said first alignment layer includes alignment regions separated from each other;
said liquid crystal alignment unit further comprises a second alignment layer, wherein said first alignment layer is provided on said second alignment layer, and said second alignment layer has an alignment direction different from that of said alignment regions of the first alignment layer.

16. The liquid crystal display panel according to claim 13, characterized in that, said smectic liquid crystal polymerizable monomer is 2-methylbutyl 4'-(4-(6-(acryloxy)hexyloxy)benzoyloxy)biphenyl-4-carboxylate.

17. The liquid crystal display panel according to claim 13, characterized in that, said binaphthol-based chiral compound is 1,1'-(4'-(2-methylbutyl) biphenyl) binaphthol ester.

18. The liquid crystal display panel according to claim 13, characterized in that, said composition further comprises a photoinitiator; wherein said smectic liquid crystal polymerizable monomer and said binaphthol-based chiral compound in the composition respectively have a mass fraction of x, y; and said photoinitiator in the composition has a mass fraction of 0.05x; and wherein x and y satisfy the following formula:

$1.05x+y=1$, wherein $y$ is between 0.04 and 0.15.

* * * * *